(12) United States Patent
Regev

(10) Patent No.: US 10,019,333 B2
(45) Date of Patent: Jul. 10, 2018

(54) METHODS, SYSTEMS, AND COMPUTER READABLE MEDIA FOR EMULATING NETWORK DEVICES WITH DIFFERENT CLOCKS

(71) Applicant: Ixia, Calabasas, CA (US)

(72) Inventor: Alon Regev, Woodland Hills, CA (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 459 days.

(21) Appl. No.: 14/688,644

(22) Filed: Apr. 16, 2015

(65) Prior Publication Data
US 2016/0306726 A1    Oct. 20, 2016

(51) Int. Cl.
| | | |
|---|---|---|
| *G06F 11/26* | (2006.01) | |
| *G06F 11/22* | (2006.01) | |
| *H04L 12/26* | (2006.01) | |

(52) U.S. Cl.
CPC ........ *G06F 11/261* (2013.01); *G06F 11/2205* (2013.01); *H04L 43/50* (2013.01)

(58) Field of Classification Search
CPC ...... G06F 11/261; G06F 1/12; G06F 17/5031; G06F 2217/62
See application file for complete search history.

(56) References Cited

U.S. PATENT DOCUMENTS

| | | |
|---|---|---|
| 6,868,069 B2 | 3/2005 | Knobbe et al. |
| 7,092,586 B2 | 8/2006 | Vokey et al. |
| 7,881,209 B2 | 2/2011 | Beliles, Jr. et al. |
| 8,718,482 B1 | 5/2014 | Roberts |
| 8,767,565 B2 | 7/2014 | Dalmau et al. |
| 9,130,945 B2 | 9/2015 | Smith et al. |
| 9,380,070 B1 | 6/2016 | Cain et al. |
| 9,686,169 B2 | 6/2017 | Formby et al. |
| 9,699,051 B2 | 7/2017 | Rata et al. |
| 9,736,804 B2 | 8/2017 | Regev |
| 9,800,595 B2 | 10/2017 | Jackson |
| 9,813,226 B2 | 11/2017 | Bergeron |
| 9,923,656 B2 | 3/2018 | Tenea et al. |

(Continued)

FOREIGN PATENT DOCUMENTS

| | | |
|---|---|---|
| WO | WO 2011/144263 A1 | 11/2011 |
| WO | WO 2016/168063 A1 | 10/2016 |
| WO | WO 2017/052714 A1 | 3/2017 |

OTHER PUBLICATIONS

Non-Final Office Action for U.S. Appl. No. 14/860,630 dated (Dec. 19, 2016).

(Continued)

*Primary Examiner* — Jigar Patel

(57) ABSTRACT

The subject matter described herein relates to methods, systems, and computer readable media for emulating network devices with different clocks. One method includes steps occurring in a network equipment test device. The steps include generating or obtaining timing information. The steps further include obtaining clock modification information. The steps further include emulating a plurality of different clocks using the timing information and the clock modification information. The method further includes emulating at least one network device that transmits test packets to a device under test using the different clocks.

19 Claims, 8 Drawing Sheets

(56) References Cited

U.S. PATENT DOCUMENTS

| | | | |
|---|---|---|---|
| 2003/0105976 | A1 | 6/2003 | Copeland, III |
| 2003/0200483 | A1 | 10/2003 | Sutton |
| 2004/0190547 | A1 | 9/2004 | Gordy et al. |
| 2007/0268938 | A1 | 11/2007 | Dowd |
| 2009/0217075 | A1* | 8/2009 | Adar .............. G01R 31/31726 713/500 |
| 2009/0231191 | A1 | 9/2009 | Wu et al. |
| 2010/0039157 | A1* | 2/2010 | Kaeriyama .............. G06F 1/08 327/292 |
| 2010/0098111 | A1* | 4/2010 | Sun ...................... H03L 7/0807 370/509 |
| 2011/0170534 | A1 | 7/2011 | York |
| 2011/0199133 | A1 | 8/2011 | Yamada |
| 2011/0211473 | A1 | 9/2011 | Matityahu et al. |
| 2011/0268097 | A1 | 11/2011 | Agrawala et al. |
| 2012/0166327 | A1 | 6/2012 | Amicangioli |
| 2012/0275317 | A1 | 11/2012 | Geva |
| 2013/0080817 | A1 | 3/2013 | Mihelic |
| 2013/0094515 | A1 | 4/2013 | Gura et al. |
| 2013/0173778 | A1 | 7/2013 | Hsy et al. |
| 2013/0212439 | A1 | 8/2013 | Stevens et al. |
| 2013/0259049 | A1 | 10/2013 | Mizrahi |
| 2013/0265886 | A1 | 10/2013 | Leong |
| 2013/0278312 | A1 | 10/2013 | Getzin et al. |
| 2013/0329595 | A1 | 12/2013 | Scholz |
| 2013/0343207 | A1 | 12/2013 | Cook et al. |
| 2013/0347103 | A1 | 12/2013 | Veteikis et al. |
| 2014/0006610 | A1 | 1/2014 | Formby et al. |
| 2014/0164860 | A1* | 6/2014 | Kim ................. G01B 31/31853 714/731 |
| 2014/0185632 | A1 | 7/2014 | Steiner et al. |
| 2014/0297852 | A1 | 10/2014 | Shimizu et al. |
| 2014/0317288 | A1 | 10/2014 | Krueger et al. |
| 2014/0321285 | A1 | 10/2014 | Chew et al. |
| 2014/0344930 | A1 | 11/2014 | Foley |
| 2015/0016274 | A1 | 1/2015 | Holland |
| 2015/0023168 | A1 | 1/2015 | Kotecha et al. |
| 2015/0023170 | A1 | 1/2015 | Kakadia et al. |
| 2015/0281025 | A1 | 10/2015 | Wallbaum et al. |
| 2016/0065434 | A1 | 3/2016 | Janakiraman |
| 2016/0110211 | A1 | 4/2016 | Karnes |
| 2016/0285575 | A1 | 9/2016 | Holmeide |
| 2016/0301589 | A1 | 10/2016 | Rata et al. |
| 2016/0301599 | A1 | 10/2016 | Porfiri et al. |
| 2016/0309434 | A1 | 10/2016 | Regev |
| 2016/0315756 | A1 | 10/2016 | Tenea et al. |
| 2017/0041126 | A1 | 2/2017 | Bergeron |
| 2017/0085581 | A1 | 3/2017 | Jackson |

OTHER PUBLICATIONS

Commonly-assigned, co-pending International Application No. PCT/US16/40532 for "Methods, Systems, and Computer Readable Media for Detecting Physical Link Instructions," (Unpublished, filed Jun. 30, 2016).

Notification of Transmittal of the International Search Report and the Written Opinion of the International Searching Authority, or the Declaration for International Application No. PCT/US2016/026534 dated (Jul. 8, 2016).

Notification of Transmittal of the International Searh report and the Written Opinion of the International Searching Authority, or the Declaration for International Application No. PCT/US2016/026533 dated (Jul. 8, 2016).

Final Office Action for U.S. Appl. No. 13/933,661 dated (Apr. 12, 2016).

Non-Final Office Action for U.S. Appl. No. 13/933,661 dated (Dec. 14, 2015).

Commonly-assigned, co-pending U.S. Appl. No. 14/860,630 for "Methods, Systems, and Computer Readable Media for Detecting Physical Link Intrusions," (Unpublished, filed Sep. 21, 2015).

Commonly-assigned, co-pending U.S. Appl. No. 14/819,337 for "Modeling a Clock," (Unpublished, filed Aug. 5, 2015).

"Network Time Protocol," Wikipedia, https://en.wikipedia.org/wiki/Network_Time_Protocol, pp. 1-7 (Jul. 3, 2015).

Commonly-assigned, co-pending U.S. Appl. No. 14/688,630 for "Methods, Systems, and Computer Readable Media for Synchronizing Timing Among Network Interface Cards (NICs) in a Network Equipment Test Device," (Unpublished, filed Apr. 16, 2015).

Commonly-assigned, co-pending U.S. Appl. No. 14/685,552 for "Methods, Systems, and Computer Readable Media for One-Way Link Delay Measurement," (Unpublished, filed Apr. 13, 2015).

"High Density Modular Fiber Tap," Ixia, http://www.ixiacom.com/products/net-optics-flex-tap, pp. 1-4 (Jul. 2014).

"Ixia Anue 3500—Mobile Backhaul Testing Solution," Ixia Data Sheet, pp. 1-5 (Dec. 2013).

Arnold, "What Are All of These IEEE 1588 Clock Types," http://blog.meinbergglobal.com/2013/10/21/ieee1588clocktypes/, News and Tutorials from Meinberg, pp. 1-6 (Oct. 21, 2013).

"AN-1838 IEEE 1588 Boundary Clock and Transparent Clock Implementation Using the DP83640," Application Report, Texas Instruments, pp. 1-9 (Apr. 2013).

Spirent, "Precision Time Protocol (PTP) IEEE 1588," YouTube "alantalkstech", https://www.youtube.com/watch?v=yw-gd01aOYg, pp. 1-11 (Dec. 7, 2011).

Eidson, "IEEE-1588 Standard for a Precision Clock Synchronization Protocol for Networked Measurement and Control Systems—A Tutorial," Agilent Technologies, pp. 1-94 (Oct. 2005).

Non-Final Office Action for U.S. Appl. No. 14/685,552 dated (Oct. 20, 2016).

Non-Final Office Action for U.S. Appl. No. 14/688,630 dated (Oct. 17, 2016).

Non-Final Office Action for U.S. Appl. No. 13/933,661 dated (Sep. 27, 2016).

Notification of Transmittal of the International Search Report and the Written Opinion of the International Searching Authority, or the Declaration for International Application No. PCT/US2016/040532 dated (Sep. 12, 2016).

Notice of Allowance and Fee(s) Due for U.S. Appl. No. 14/819,337 dated (Jun. 21, 2017).

Notice of Allowance and Fee(s) Due and Examiner Initiated Interview Summary for U.S. Appl. No. 14/860,630 dated (Jun. 13, 2017).

Non-Final Office Action for U.S. Appl. No. 14/809,513 dated (May 30, 2017).

Notice of Allowance and Fee(s) Due for U.S. Appl. No. 14/688,630 dated (Apr. 12, 2017).

Commonly-assisted, co-pending U.S. Appl. No. 15/482,672 for "Methods, Systems, and Computer Readable Media for Monitoring, Adjusting, and Utilizing Latency Associated With Accesing Distributed Computing Resoueces," (Unpublished, filed Apr. 7, 2017).

Non-Final Office Action for U.S. Appl. No. 14/819,337 dated (Mar. 2, 2017).

Notice of Allowance and Fee(s) Due for U.S. Appl. No. 14/685,552 dated (Mar. 1, 2017).

Notice of Allowance and Fee(s) Due for U.S. Appl. No. 13/933,661 dated (Feb. 17, 2017).

"External Bypass Switches," Ixia, White Paper, 915-6688-01 Rev. B, pp. 1-5 (Dec. 2015).

Watt et al., "Understanding and Applying Precision Time Protocol," Power and Energy Automation Conference, pp. 1-7 (Mar. 2014).

"AN-1728 IEEE 1588 Precision Time Protocol Time Synchronization Performance," Application Report, SNLA098A, Texas Instruments, pp. 1-10 (Apr. 2013).

Notice of Allowance and Fee(s) Due for U.S. Appl. No. 14/809,513 dated (Nov. 7, 2017).

\* cited by examiner

METHODS, SYSTEMS, AND COMPUTER READABLE MEDIA FOR EMULATING NETWORK DEVICES WITH DIFFERENT CLOCKS

TECHNICAL FIELD

The subject matter described herein relates to emulating network devices with different clocks. More particularly, the subject matter described herein relates to methods, systems, and computer readable media for emulating network devices with different clocks.

BACKGROUND

In testing network devices it is desirable to execute tests that utilize clocks that are offset in phase and/or frequency with respect to each other. For example, in one test, it may be desirable to test an IEEE 1588 compliant device's response to different master clock sources. In order to perform such a test, IEEE 1588 masters with different clocks must be emulated. One way to emulate devices with different clocks is to use individual clock hardware in each device to generate its own clock values. However, this approach does not allow for simulation of clock jitter, latency, or other effects related to changes in clock frequency and/or phase over time. In addition, a solution that requires dedicated clock hardware for each clock is not scalable.

FIG. 1 illustrates a generic test setup for testing a device under test. Referring to FIG. 1, network equipment test device 100 transmits test packets to a device under test 102. More particularly, a network interface card 104 on network equipment test device 100 transmits a test packet to device under test 102, and device under test 102 returns the test packet to another network interface card 108 on network equipment test device 100. In a timing related test, test packet 106 may have a timestamp value that is generated based on a clock local to network equipment test device 100. If a stream of test packets 106 is transmitted to device under test 102, it may be desirable to simulate clock drift or other phenomena to see how device under test 102 responds to such changes in clock frequency and/or phase.

Accordingly, there exists a need for methods, systems, and computer readable media for your emulating network devices with different clocks.

SUMMARY

The subject matter described herein relates to methods, systems, and computer readable media for emulating network devices with different clocks. One method includes steps occurring in a network equipment test device. The steps include generating or obtaining timing information. The steps further include obtaining clock modification information. The steps further include emulating a plurality of different clocks using the timing information and the clock modification information. The method further includes emulating at least one network device that transmits test packets to a device under test using the different clocks.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
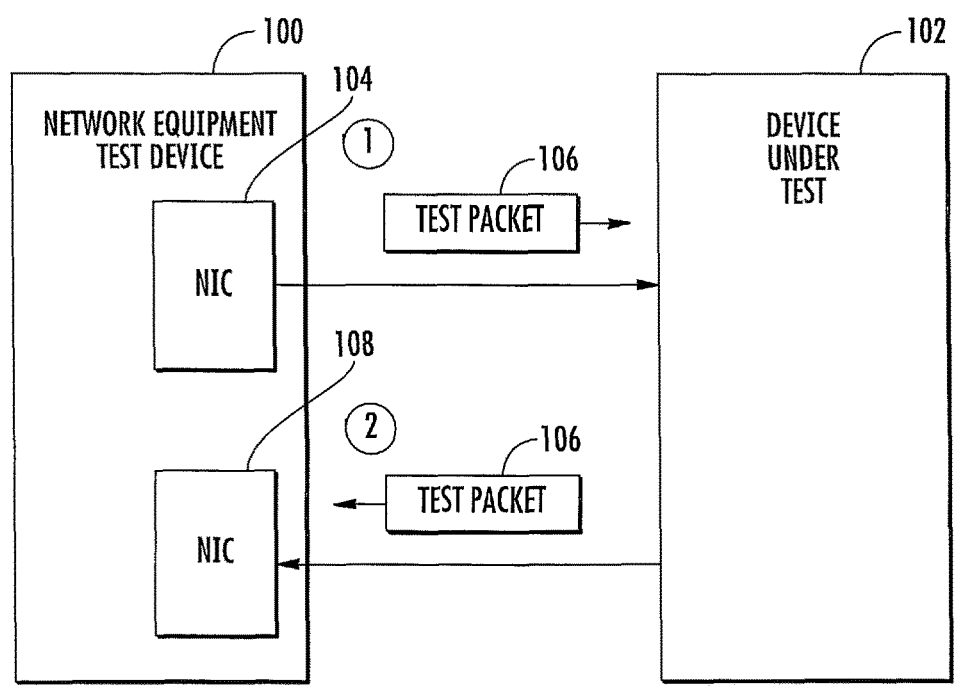
FIG. 1 is a block diagram illustrating a network equipment test device transmitting test packets to a device under test.
Figure 2:
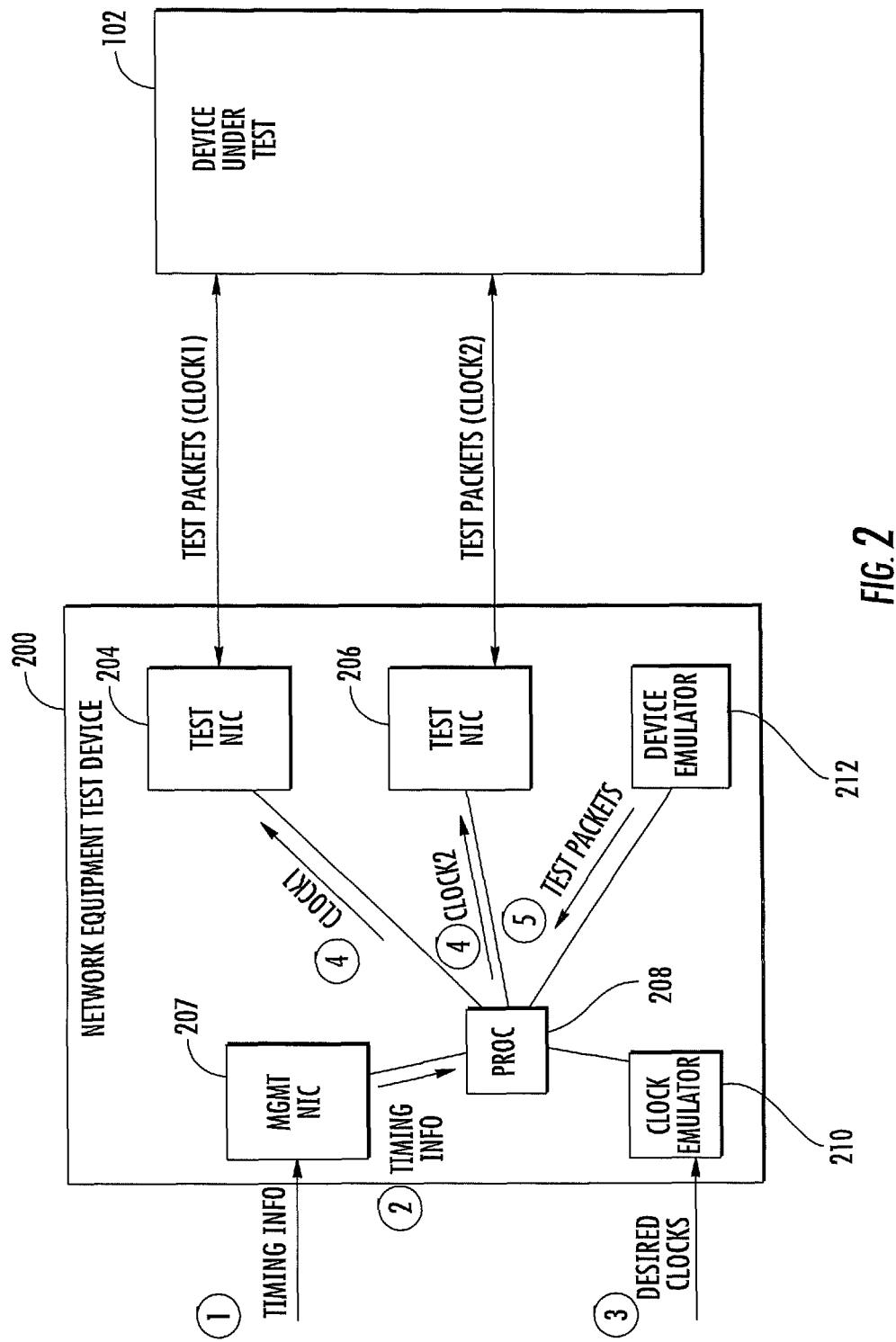
FIG. 2 is a block diagram illustrating a network equipment test device that emulates plural clocks and transmits test packets to a device under test using the plural clocks according to an embodiment of the subject matter described herein.

The subject matter described herein includes methods, systems, and computer readable media for emulating network devices with different clocks. FIG. 2 is a block diagram illustrating a network equipment test device 200 that emulates plural different clocks and uses the clocks to transmit test packets to a device under test 102 according to an embodiment of the subject matter described herein. Referring to FIG. 2, network equipment test device 200 includes a plurality of test network interface cards 204 and 206 a management network interface card 207. Test network interface cards 204 and 206 include hardware and software for transmitting test packets to and receiving test packets from device under test 102. In one embodiment, test network interface cards 204 and 206 may be Ethernet network interface cards capable of transmitting Ethernet frames to and receiving Ethernet frames from device under test 102. Management network interface card 207 may also be an Ethernet network interface card. Management network interface card 207 may further implement a timing synchronization protocol such as IEEE 1588 for obtaining timing information from an external source. In another embodiment, management network interface card 207 may obtain timing information from a global positioning system (GPS) signal. In yet another embodiment, management network interface card 207 may generate its own timing information using an internal clock located on management network interface card 207.

Network equipment test device 200 further includes a processor 208 that communicates with NICs 204 and that also implements a clock emulator 210 and a device emulator 212. Clock emulator 210 receives information regarding desired clocks to be emulated. Device emulator 212 emulates devices that generate and send test packets to device under test 102.

In one embodiment, clock emulator 210 may receive information for generating or emulating different clocks based on the timing information received from management NIC 207. For example, management NIC 207 may communicate the time of day and/or other timing related information obtained from an external source or generated internally to clock emulator 210. In addition to receiving the timing information from management NIC 207, clock emulator 210 may receive input from the user that indicates a frequency adjustment factor and an offset usable to generate an emulated clock from the time of day value obtained from management NIC 207. Equation 1 shown below illustrates an exemplary relationship between clock or time of day values generated by management NIC 207 and emulated clock values.

$$\text{Clock\_Test\_Int} = \text{Freq\_Adj\_Factor}(\text{Clock\_Mgmt\_Int}) + \text{Offset} \quad (1)$$

In Equation 1 above, Clock_Test_Int is an emulated clock value for a given test interface. Freq_Adj_Factor is the frequency adjustment factor that indicates the relative amount by which the frequency of the emulated clock is to be adjusted with respect to that of the management interface clock. The variable Clock_Mgmt_Int is the current clock value or time of day of the management interface. The variable Offset is the phase offset between the emulated clock and the management interface clock.

In one example, it may be desirable for one test NIC 204 to send test packets to device under test 102 using one clock value, labeled Clock1 in FIG. 2 and to have another test NIC 207 send test packets to device under test 102 using another clock value, labeled Clock2 in FIG. 2. To generate Clock1, in this example, it is assumed the user specifies a frequency adjustment factor of 2 and an offset of 0. Thus, using Equation 1 above, the formula for each clock value of Clock1 is:

$$\text{Clock1} = 2 \times \text{Clock\_Mgmt\_Int} + 0$$

Table 1 shown below illustrates values of clock 1 with respect to the values of the management interface clock.

TABLE 1

Clock Values for Emulated Clock1

| Clock_Mgmt_Int | Clock1 |
|---|---|
| 1 | 2 |
| 2 | 4 |
| 3 | 6 |
| 4 | 8 |

TABLE 1-continued

Clock Values for Emulated Clock1

| Clock_Mgmt_Int | Clock1 |
|---|---|
| 5 | 10 |
| 6 | 12 |
| 7 | 14 |

In this example, it is assumed that the second clock value, Clock2, also has a frequency adjustment factor of 2, but an offset of 2. Thus, using Equation 1, the values for Clock2 can be determined as follows:

$$\text{Clock2} = 2 \times \text{Clock\_Mgmt\_Int} + 2$$

Table 2 illustrated values of the variables clock_mgmt_int and emulated clock, Clock2.

TABLE 2

Clock Values for Emulated Clock2

| Clock_Mgmt_Int | Clock2 |
|---|---|
| 1 | 4 |
| 2 | 6 |
| 3 | 8 |
| 4 | 10 |
| 5 | 12 |
| 6 | 14 |
| 7 | 16 |

Figure 3:
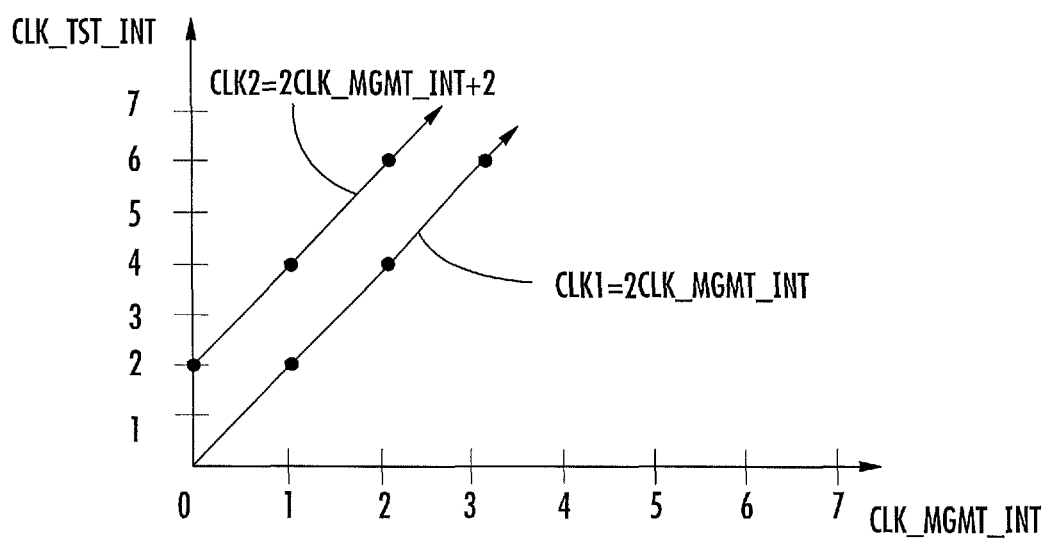
FIG. 3 is a graph illustrating a method for generating plural different clock values from a management interface clock value according to an embodiment of the subject matter described herein.

FIG. 3 graphically illustrates the relationships between the management interface clock and the two emulated clocks, Clock1 and Clock2. In FIG. 3, the horizontal axis represents clock values at the management network interface card and the vertical axis represents the emulated or test interface clock values.

According to another aspect of the subject matter described herein, it may be desirable to emulate a clock whose frequency adjustment factor varies with time. Table 3 shown below illustrates an example of a frequency adjustment factor that varies with time.

TABLE 3

Exemplary Values for Variable Frequency Adjustment Factor

| Time | Freq_Adj_Factor |
|---|---|
| 0 | 2 |
| 1 | 2.1 |
| 2 | 2.2 |
| 3 | 2.3 |
| 4 | 2.2 |
| 5 | 2.1 |
| 6 | 2 |

Using the data in Table 3 and Equation 1, values for the test network interface clock are as follows:

TABLE 4

Emulated Clock Values for a Variable Frequency Adjustment Factor

| $T_{Mgmt\_Int}$ | $T_{test\_Int}$ |
|---|---|
| 0 | 0 |
| 1 | 2.2 |
| 2 | 4.4 |
| 3 | 6.9 |

TABLE 4-continued

Emulated Clock Values for a Variable Frequency Adjustment Factor

| $T_{Mgmt\_Int}$ | $T_{test\_Int}$ |
|---|---|
| 4 | 8.8 |
| 5 | 10.5 |
| 6 | 12 |

Figure 4A:
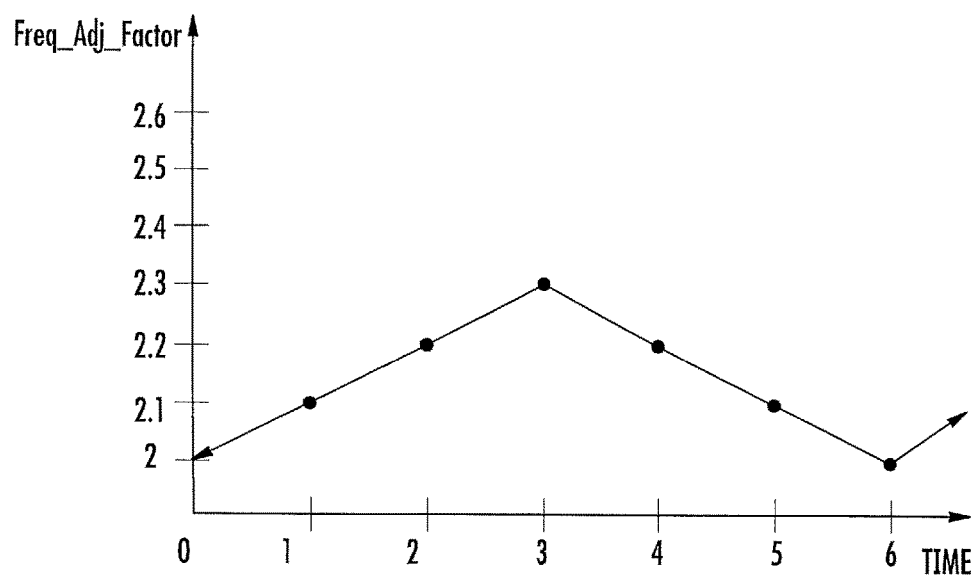
FIGS. 4A and 4B are graphs illustrating the generation of an emulated clock value using a frequency adjustment factor that varies with time according to an embodiment of the subject matter described herein.
Figure 4B:
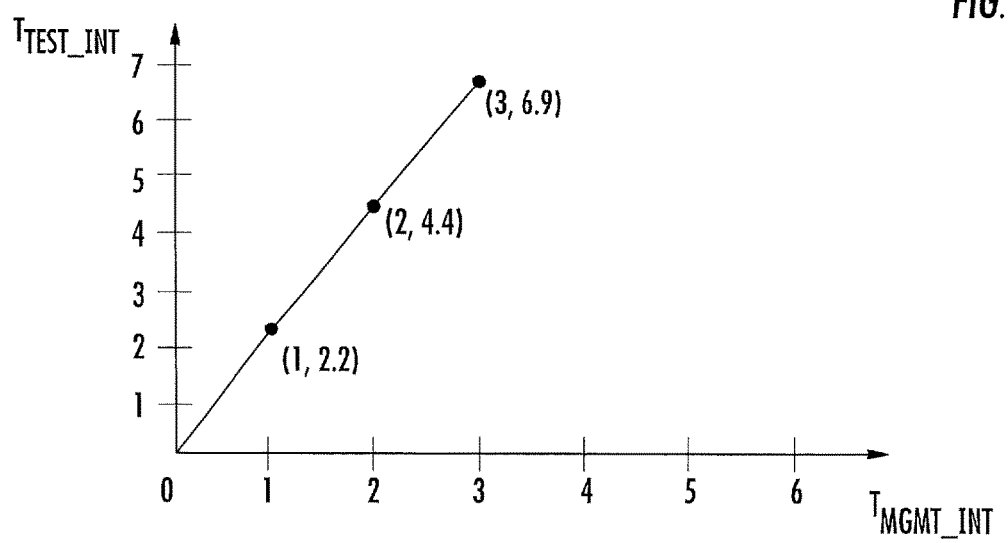

FIGS. 4A and 4B illustrate graphically the data in Tables 3 and 4. More particularly, FIG. 4A represents the frequency adjustment factor that varies with time. FIG. 4B illustrates the emulated clock values corresponding to the management interface clock values when the frequency adjustment factor varies with time. As can be seen from FIG. 4B, because the frequency adjustment factor varies with time, the slope of the curve also changes with time.

According to another aspect of the subject matter described herein, it may be desirable to allow the offset between the management interface clock and the emulated clocks to vary with time. In one example, the offset may vary in a saw tooth pattern with respect to time. Table 5 shown below illustrates exemplary data for varying a clock phase offset with respect to time, which may be used to emulate a clock according to an embodiment of the subject matter described herein.

TABLE 5

Variable Clock Phase Offset

| Time | Phase Offset |
|---|---|
| 0 | 1 |
| 1 | 2 |
| 2 | 1 |
| 3 | 2 |
| 4 | 1 |
| 5 | 2 |
| 6 | 1 |
| 7 | 2 |

Table 6 shown below illustrated exemplary emulated clock values generated using the variable offset illustrated in Table 5. In this example it is assumed that the frequency adjustment factor is 1 or unity.

TABLE 6

Emulated Clock Data for Variable Phase Offsets

| $T_{Mgmt\_Int}$ | $T_{test\_Int}$ |
|---|---|
| 0 | 1 |
| 1 | 3 |
| 2 | 3 |
| 3 | 5 |
| 4 | 5 |
| 5 | 7 |
| 6 | 7 |
| 7 | 10 |

Figure 5A:
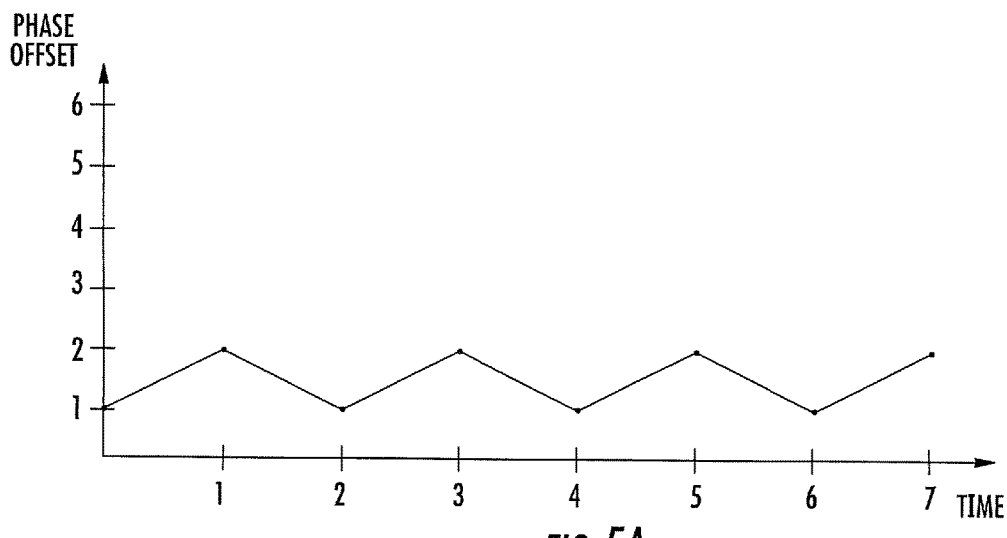
FIGS. 5A and 5B are graphs illustrating the generation of emulated clock values using an offset that varies with time according to an embodiment of the subject matter described herein.
Figure 5B:
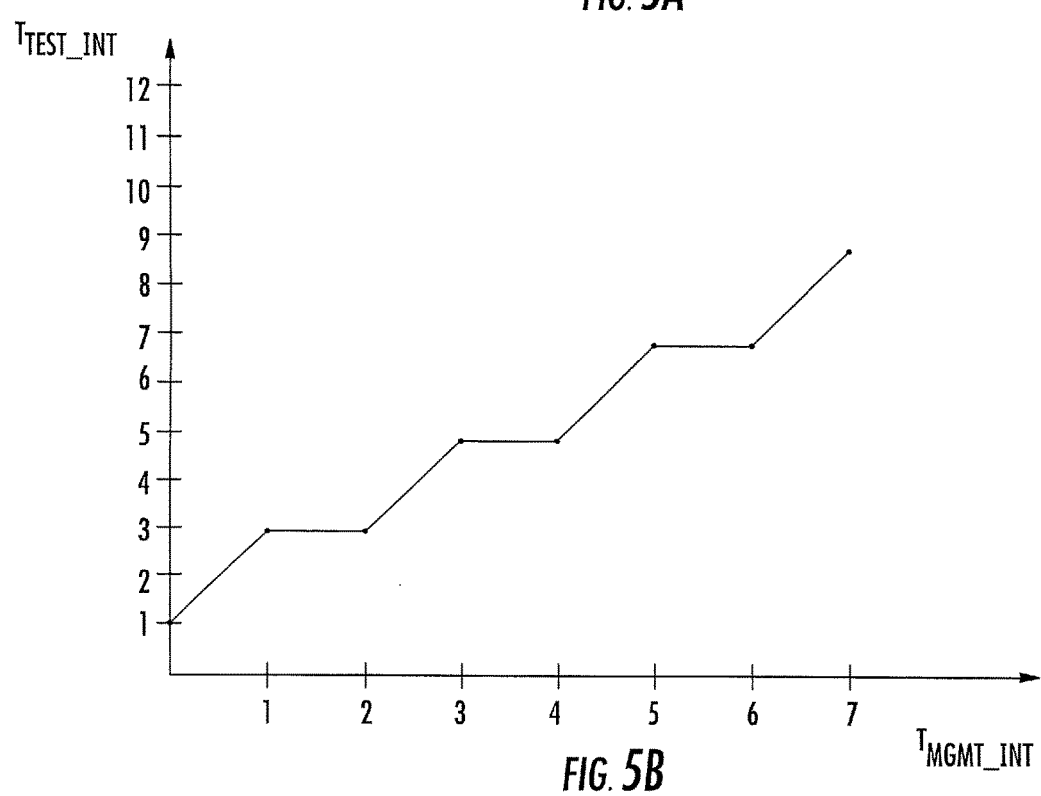

FIGS. 5A and 5B illustrate graphically the data in Tables 5 and 6. More particularly, FIG. 5A illustrates an example of a phase offset that varies with time, and FIG. 5B illustrates emulated clock values from management network interface values assuming the time varying offset in FIG. 5A.

Figure 6:
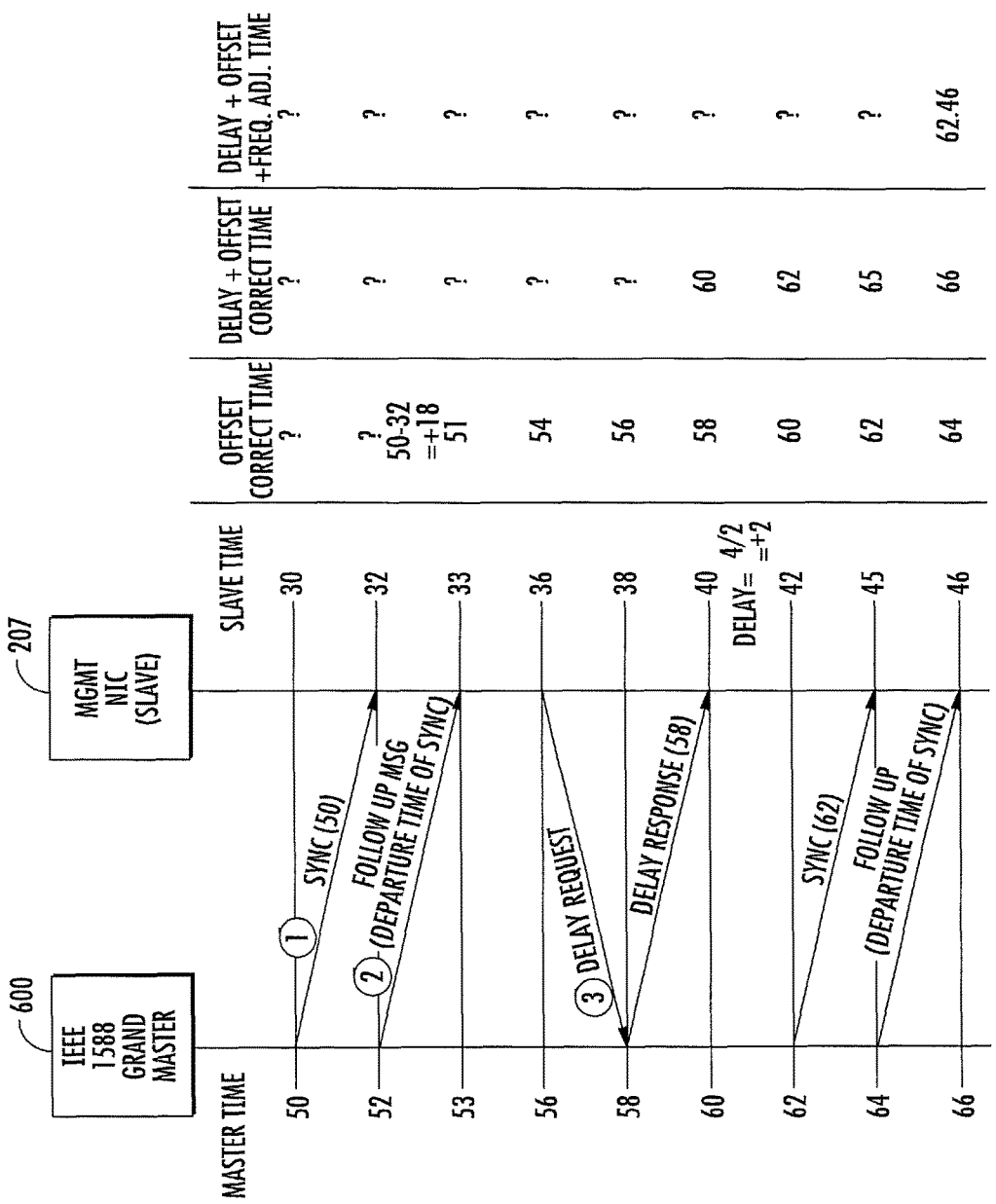
FIG. 6 is a message flow diagram illustrating an exemplary process for obtaining clock information at a management network interface of a network equipment test device according to an embodiment of the subject matter described herein.

As stated above, management NIC 207 may obtain its clock value from an external source. FIG. 6 is a message flow diagram illustrating one method by which management NIC 207 may obtain its clock value. Referring to FIG. 6, management NIC 207 communicates with an IEEE 1588 grand master node 600. An IEEE 1588 grand master is a clock source in a network that has been elected by other sources in the network as the most precise clock in the network. All other clock sources in the network synchronize with the IEEE 1588 grand master and are referred to as slaves. In the illustrated example, management NIC 207 is assumed to be a slave. Referring to the message flow, in line 1, the IEEE 1588 grand master sends a sync message to management NIC 207. In line 2, the IEEE 1588 grand master sends a follow-up message that includes a hardware time stamp corresponding to the precise departure time of the sync. In the illustrated example, it is assumed that the departure time of the sync is 50, recorded in master clock time. Once management NIC 207 receives the follow-up message, management NIC 207 can compute the offset corrected time. In the illustrated example, management NIC receives the sync signal at time 32 in slave time. The departure time of the sync signal recorded in master time is 50. Accordingly, management NIC 207 computes the offset between the master and slave clock as +18. At this point, management NIC 207 knows the offset corrected time but has not yet accounted for network delay.

In order to account for network delay, management NIC 207 sends a delay request message to grand master 600. Grand master 600 returns a delay response. Management NIC 207 computes the roundtrip time for the delay request and the delay response, which in the illustrated example is 4 seconds. Management NIC 207 assumes that the network delay is symmetric and therefore computes that the one way delay is +2. Once the one way network delay is computed, management NIC 207 can compute the delay and offset corrected time. Because the offset is 18 and the network delay is +2, at time 40, the slave computes the delay and offset corrected time to be 60.

In addition to calculating the delay and offset between the master and slave clocks, the management NIC may also determine the frequency adjustment factor between the master and slave clocks. The frequency adjustment factor can be determined by grand master 600 transmitting sync and follow up messages to management NIC 207. In the example illustrated in FIG. 5, the master transmits the second sync at master time 62 and it is received by the slave at slave time 45. The frequency adjustment factor can then be computed using the transmission time and time of receipt of the first sync, the transmission time and the time of receipt of the second sync, and the following equation. Plugging the data into Equation 1, the frequency adjustment factor is as follows:

$$\text{Freq\_Adj\_Factor} = \frac{(T_{sync2\_master} - T_{sync1\_master})}{(T_{sync2\_slave} - T_{sync1\_slave})}$$

$$= \frac{(62 - 50)}{(45 - 32)}$$

$$= 0.9230769$$

In the above-listed equation, the variables $T_{sync1\text{-}master}$ and $T_{sync\text{-}master}$ are the transmission times of the first and second sync packets recorded in the master's local clock time. The variables $T_{sync1\_slave}$ and $T_{sync2\_slave}$ are the receipt times of the first and second sync packets recorded in the slave's local clock time. Once the frequency adjustment factor, the delay, and the offset are known, the delay, offset, and frequency adjusted time at the slave NIC can be calculated using the following equation:

Clock_Slave_Adj=Freq_Adj_Factor(Clock_Slave_Unadj)+Offset Clock_Slave_Adj=0.9230769(46)+20=62.46

In the above-listed equation, Clock_Slave_Adj is the frequency, offset, and delay adjusted value of the slave clock. Clock_Slave_Unadj is the unadjusted slave clock value for which it is desirable to compute an adjusted slave clock value. Freq_Adj_Factor is the frequency adjustment factor computed above. Offset is the total offset accounting for both network delay and initial phase offset between the master and slave clocks. The value for the frequency adjustment factor is 0.92307, computed as shown in the preceding paragraph. From FIG. 6, the value of the slave clock at the time of receipt of the second follow up signal is 46. The offset is 18+2=20. The value 62.46 represents the frequency, delay, and phase offset corrected time when the unadjusted slave time is 46. The calculation of the frequency adjustment factor, the propagation delay, and the phase offset may be repeated periodically so that management NIC 207 maintains its synchronization with IEEE 1588 grand master 600.

Figure 7:
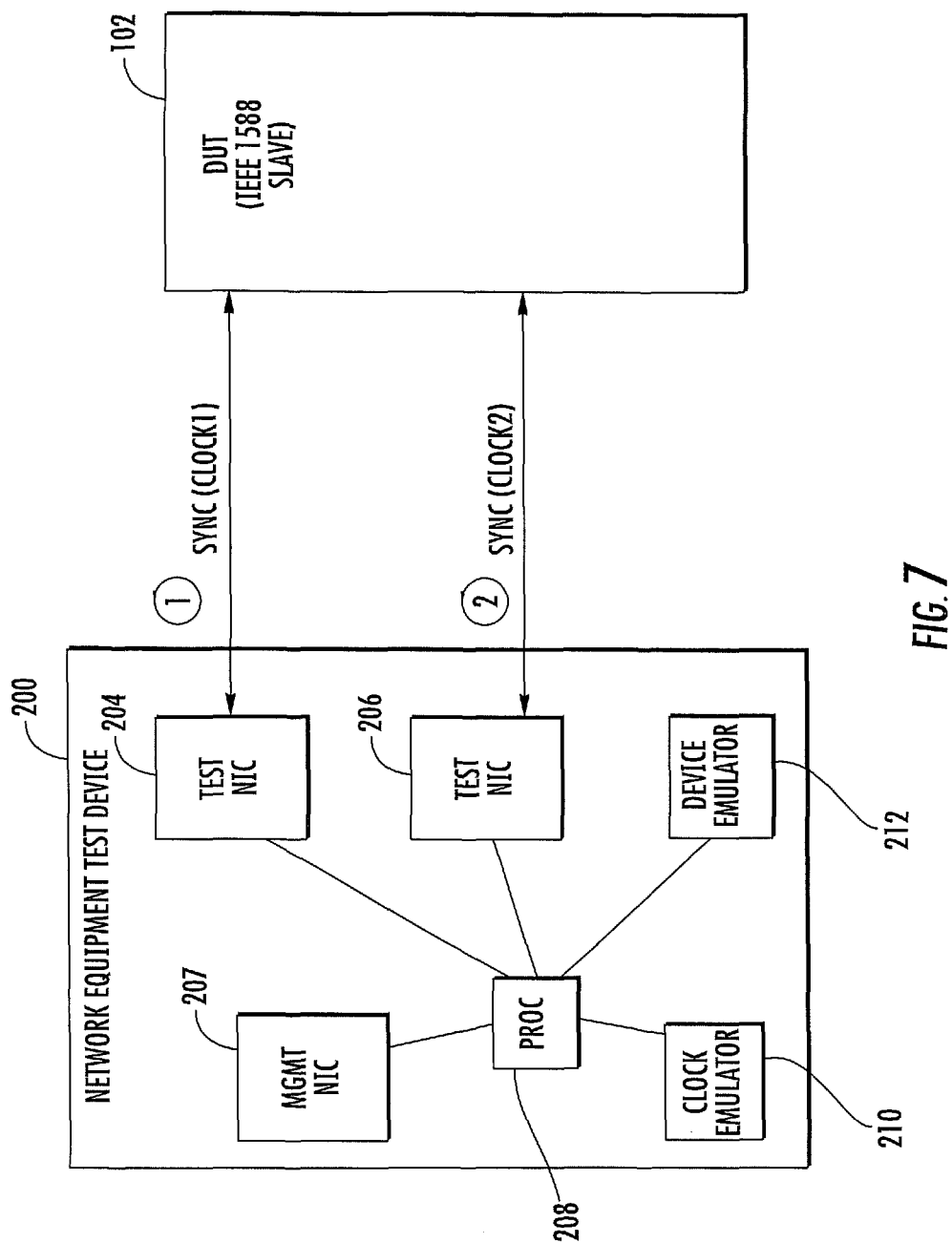
FIG. 7 is a diagram illustrating a network equipment test device emulating two IEEE 1588 grand masters and testing the response of the device under test according to an embodiment of the subject matter described herein.

Thus, using IEEE 1588, management MC 207 may obtain a precise time source, which may be used to emulate different clocks, as described above. However, the subject matter described herein is not limited to using IEEE 1588 to obtain the precise time value at the management NIC. In another example, management NIC 207 may include its own precise internal clock source or may obtain the precise time from an external source, such as GPS FIG. 7 is a block diagram illustrating the use of network equipment test device 200 to emulate multiple IEEE 1588 grand masters with different clocks. Referring to FIG. 7, network equipment test device 200 may emulate a first IEEE 1588 grand master by exchanging sync and delay of request/response messages with device under test 102, which functions as an IEEE 1588 slave. The protocol for synchronizing with the IEEE 1588 grand master may be similar to that illustrated in FIG. 6.

Device emulator 212 and clock emulator 210 may emulate a second IEEE 1588 grand master that syncs with device under test 102 via a second test NIC 206. The messages exchanged for the second synchronization may be similar to those illustrated in FIG. 6. After device under test 200 is synced to two different IEEE 1588 grand masters, device emulator 212 may simulate failure of one of the grand masters by ceasing to send frequency update messages to device under test 102. Network equipment test device 200 may monitor the response of device under test 102 to the failure of the IEEE 1588 grand master. For example, network equipment test device 200 may monitor whether device under test 102 continues to respond to update messages from the remaining IEEE 1588 grand master and whether the timestamps included in packets transmitted from device under test 102 are consistent with the time of day of the remaining IEEE 1588 grand master.

Figure 8:
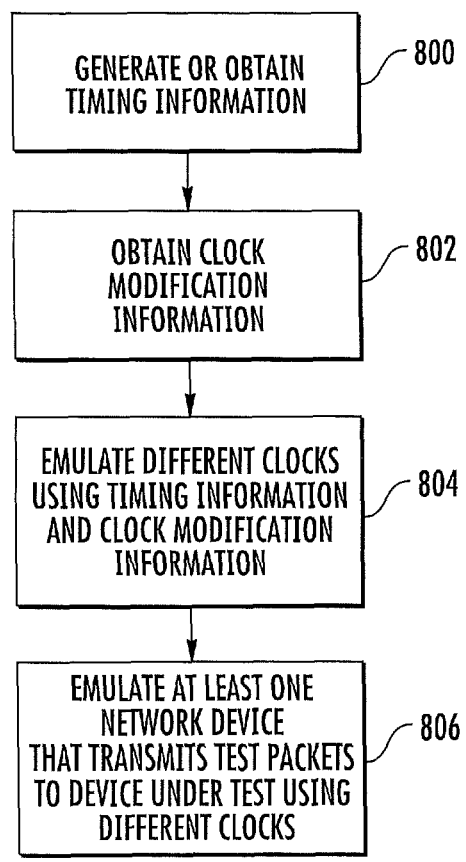
FIG. 8 is a flow chart illustrating an exemplary process for emulating network devices with different clocks according to an embodiment of the subject matter described herein.

FIG. 8 is a flow chart illustrating an exemplary process for emulating network devices with different clocks according to an embodiment of the subject matter described herein. Referring to FIG. 8, in step 800, timing information is generated or obtained. For example, management NIC 207 in network equipment test device 200 may obtain an external clock from an IEEE 1588 grand master or may generate its own initial clock value. The clock may have frequency and a time of day useable to generate time stamps. In step 802, clock modification information is obtained. For example, clock emulator 210 may receive frequency adjustment factors and/or phase offsets for generating different clocks. This information may be input by user or read from a file.

In step 804, different clocks are emulated using the timing information and the clock modification information. For example, different clocks may be emulated using Equation 1, as described above. In step 806, at least one network device that transmits test packets to a device under test is emulated using the different clocks. For example, device emulator 212 may generate and send packets to the device under test. In one example, one stream of packets may be time stamped using the first clock and a second stream of packets may be time stamped using the second clock. The streams may be sent over the same or different network interfaces to test the response of device under test 102 to the packets and the clock values. The frequency and/or phase offset may vary with time to simulate clock drift, clock jitter, or other timing related phenomena.

For example, to simulate a timing related effect, device emulator 212 may start sending packets to device under test 102. Device emulator 212 may timestamp the packets using a clock obtained from clock emulator 210. To emulate jitter, clock emulator 210 may vary the phase and/or frequency of the clock over time such that the timestamps advance non-uniformly with respect to time. Network equipment test device 200 may monitor packets received from device under test 102 to see how device under test 102 responds to the jitter or other timing related effect or impairment.

Thus, using clock emulation as described herein, a network equipment test device solves the technological problem of efficiently emulating multiple different clock sources without requiring dedicated clock hardware for each clock being emulated. Such a network equipment test device constitutes both a particular machine and a special purpose computing platform that tests devices in a network.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for emulating network devices with different clocks, the method comprising:
   in a network equipment test device:
      generating or obtaining timing information to produce a first clock;
      obtaining clock modification information, wherein the clock modification information includes at least one of frequency adjustment factors and phase offsets for generation of different emulated clocks that differ from each other in at least one of frequency and phase to simulate at least one of clock drift and clock jitter;
      emulating the different clocks using the timing information and the clock modification information, wherein the different emulated clocks differ from each other in at least one of frequency and phase to simulate at least one of clock drift and clock jitter; and
      emulating at least one network device that transmits test packets to a device under test using the different clocks, wherein different ones of the test packets include timestamps generated using the emulated clocks that differ from each other in at least one of frequency and phase.

2. The method of claim 1 wherein generating or obtaining timing information includes obtaining timing information from an IEEE 1588 grand master.

3. The method of claim 1 wherein emulating the different clocks includes utilizing the frequency adjustment factors to adjust frequencies of each emulated clock to be different from a frequency of the first clock.

4. The method of claim 1 wherein emulating the different clocks includes utilizing the phase offsets to vary phases of the emulated clocks to be different from a phase of the first clock.

5. The method of claim 1 wherein emulating the different clocks values includes, for packets in a first stream, varying over time at least one of a frequency adjustment factor and a phase offset.

6. The method of claim 1 wherein emulating at least one network device includes emulating an IEEE1588 grand master.

7. The method of claim 1 wherein emulating at least one network device includes varying a phase and/or frequency of at least one of the emulated clocks used to generate the timestamps in the packets transmitted to the device under test so that the timestamps advance non-uniformly with respect to time.

8. The method of claim 7 wherein varying the phase and/or frequency of the at least one of the emulated clocks includes varying the phase and/or frequency to simulate clock jitter.

9. The method of claim 7 comprising monitoring a response of the device under test to the changes in phase and/or frequency of the at least one of the emulated clocks.

10. A system for emulating network devices with different clocks, the system comprising;
    a network equipment test device for generating or obtaining timing information and for obtaining clock modification information, wherein the clock modification information includes at least one of frequency adjustment factors and phase offsets for generation of different emulated clocks that differ from each other in at least one of frequency and phase to simulate clock at least one of clock drift and clock jitter;
    a clock emulator located within the network equipment test device for emulating the different clocks using the timing information on the clock modification information, wherein the different emulated clocks include at least one of frequency adjustment factors and phase offsets for generation of different emulated clocks that differ from each other in at least one of frequency and phase to simulate clock at least one of clock drift and clock jitter; and
    a device emulator for emulating at least one network device that transmits test packets to device under test using the different clocks, wherein different ones of the test packets include timestamps generated using the emulated clocks that differ from each other in at least one of frequency and phase.

11. The system of claim 10 wherein the network equipment test device is configured to obtain timing information IEEE 1588 grand master.

12. The system of claim 10 wherein the clock emulator is configured to emulate the different clocks utilizing the frequency adjustment factors to adjust frequencies of the emulated clocks to be different from a frequency of the first clock.

13. The system of claim 10 wherein the clock emulator is configured to utilize the phase offsets to vary phases of the emulated clocks to be different from a phase of the first clock.

14. The system of claim 10 wherein the clock emulator is configured to vary over time at least one of a frequency adjustment factor and a phase offset used to generate the different emulated clocks.

15. The system of claim 10 wherein the device emulator is configured to emulate at least one network device includes emulating an IEEE 1588 grand master.

16. The system of claim 10 wherein the device emulator is configured to vary a phase and/or frequency of at least one of the emulated clocks used to generate the timestamps in the packets transmitted to the device under test so that the timestamps advance non-uniformly with respect to time.

17. The system of claim 16 wherein the clock emulator is configured to vary the phase and/or frequency of the at least one of the emulated clocks to simulate clock jitter.

18. The system of claim 16 wherein the network equipment test device is configured to monitor a response of the device under test to the changes in phase and/or frequency of the at least one of the emulated clocks.

19. A non-transitory computer readable medium having stored thereon executable instructions that when executed by the processor of a computer control the computer to perform steps comprising:
    in a network equipment test device:
        generating or obtaining timing information to produce a first clock;
        obtaining clock modification information, wherein the clock modification information includes at least one of frequency adjustment factors and phase offsets for generation of different emulated clocks that differ from each other in at least one of frequency and phase to simulate clock at least one of clock drift and clock jitter;
        emulating the different clocks using the timing information and the clock modification information, wherein the different emulated clocks differ from each other in at least one of frequency and phase to simulate at least one of clock drift and clock jitter; and
        emulating at least one network device that transmits test packets to a device under test using the different clocks, wherein different ones of the test packets include timestamps generated using the emulated clocks that differ from each other in at least one of frequency and phase.

* * * * *

UNITED STATES PATENT AND TRADEMARK OFFICE
CERTIFICATE OF CORRECTION

PATENT NO. : 10,019,333 B2
APPLICATION NO. : 14/688644
DATED : July 10, 2018
INVENTOR(S) : Alon Regev Page 1 of 1

It is certified that error appears in the above-identified patent and that said Letters Patent is hereby corrected as shown below:

On the Title Page

In item (71), in Column 1, in "Applicant", Line 1, delete "Ixia, Calabasas, CA (US)" and insert -- Keysight Technologies Singapore (Holdings) Pte. Ltd., Minneapolis, MN (US) --, therefor.

Signed and Sealed this
Twenty-second Day of January, 2019

Andrei Iancu
*Director of the United States Patent and Trademark Office*